United States Patent [19]

Watanabe et al.

[11] Patent Number: 5,678,916

[45] Date of Patent: Oct. 21, 1997

[54] VEHICULAR HEADLAMPS

[75] Inventors: Shinji Watanabe; Hideshi Mori; Toshihiko Nakazawa; Akira Saijo, all of Shizuoka, Japan

[73] Assignee: Koito Manufacturing Co., Ltd., Tokyo, Japan

[21] Appl. No.: 588,853

[22] Filed: Jan. 19, 1996

[30] Foreign Application Priority Data

Jan. 20, 1995 [JP] Japan .................................. 7-007036

[51] Int. Cl.$^6$ .................................................. F21M 3/02
[52] U.S. Cl. ............................ 362/61; 362/80; 362/265
[58] Field of Search ...................... 362/61, 263, 264, 362/265, 80

[56] References Cited

U.S. PATENT DOCUMENTS

| 5,107,405 | 4/1992 | Makita | 362/61 |
|---|---|---|---|
| 5,113,330 | 5/1992 | Makita | 362/265 |
| 5,119,275 | 6/1992 | Makita | 362/61 |
| 5,140,504 | 8/1992 | Sato | 362/61 |
| 5,158,350 | 10/1992 | Sato | 362/61 |
| 5,188,444 | 2/1993 | Makita et al. | 362/80 |
| 5,219,444 | 6/1993 | Chiaramonte et al. | 362/61 |
| 5,228,766 | 7/1993 | Makita et al. | 362/61 |
| 5,260,856 | 11/1993 | Perthus et al. | 362/61 |
| 5,343,370 | 8/1994 | Ohashi et al. | 362/61 |
| 5,584,559 | 12/1996 | Toda | 362/61 |

FOREIGN PATENT DOCUMENTS

| 2244123 | 11/1991 | United Kingdom . |
| 2277796 | 11/1994 | United Kingdom . |

Primary Examiner—Alan Cariaso
Attorney, Agent, or Firm—Sughrue, Mion, Zinn, Macpeak & Seas, PLLC

[57] ABSTRACT

A vehicular headlamp which includes a vessel-like lamp body, a front lens coupled to a front opening of the lamp body to define a lamp chamber, a discharge bulb serving as a light source and a reflector for reflecting light beam emitting from the discharge bulb, wherein the lamp body is provided at a back wall thereof an opening part for exchanging the bulb, a starter unit installing therein a starter circuit constituting a part of a discharge bulb lighting device is secured to the opening part of the lamp body, and a stabilizer constituting a part of the discharge bulb lighting device is secured to a bottom part of the lamp body outside the lamp chamber.

25 Claims, 12 Drawing Sheets

VEHICULAR HEADLAMPS

BACKGROUND OF THE INVENTION

1. Field of the Invention

The present invention relates to a vehicular headlamp employing as a light source a discharge lamp such as a metal-halide bulb or the like.

2. Related Art

Conventional headlamps of this type are as disclosed in Unexamined Japanese Patent Publication No. Hei. 3-133202 and Unexamined Japanese Utility Model Publication No. Hei. 5-41964, which are schematically shown in FIGS. 12 and 13, respectively. The conventional headlamps includes a lamp body 1, a front lens 2 coupled to a front opening of the lamp body 1 to define a lamp chamber $S_1$ ($S_2$), a reflector 4 housed in the lamp chamber, and a discharge bulb 4 installed on the reflector.

The first conventional headlamp shown in FIG. 12 is of a reflector-movable type in which the reflector 3 is pivotally supported on the lamp body 1 by an aiming mechanism. The aiming mechanism is composed of an aiming screw 6 rotatably supported by a back wall of the lamp body, a nut 6a engaging with the aiming screw 6 at the reflector side and a pivot fulcrum 8 constituted by a bail-Joint structure provided between the lamp body 1 and the reflector 3.

On the other hand, the second conventional headlamp shown in FIG. 13 is of a unit-movable type in which the lamp body 1 is pivotally supported on a lamp housing H by an aiming mechanism. The aiming mechanism is composed of an aiming screw 6 and a pivot fulcrum 8.

Both the first and second conventional headlamps are provided with a lighting device 5 for generating a discharge power applied to the discharge bulb 4 and a stabilizer for stably maintaining the discharge. In the first conventional headlamp shown in FIG. 12 the lighting device 5 is disposed within the lamp chamber $S_1$ at behind the reflector 2 whereas in the second conventional headlamp shown in FIG. 13 the lighting device 5 is disposed within the lamp chamber $S_2$ under the reflector 3.

There has been known a third conventional headlamp as disclosed in Unexamined Japanese Utility Model Publication No. Hei. 4-105401 which is schematically shown in FIG. 14. According to the third conventional headlamp, as shown in FIG. 14, the lamp body 1 and the front lens 2 define a lamp chamber $S_3$ within which the reflector 3 installing thereon the discharge bulb 4 is pivotally supported on the lamp body 1 by the aiming mechanism which is composed of the aiming screws 8, 7 and other members. In the third conventional headlamp, the lighting device 5 is secured to a rear surface of a back wall of the lamp body 1, which is hence located outside the lamp chamber $S_3$, so that the lighting device 5 can readily be exchanged when it is broken.

However, according to either of the first and second conventional headlamps shown in FIGS. 12 and 13, since the lighting device 5 is disposed within the lamp chamber $S_1$ ($S_2$) temperature of which is highly risen up when the discharge bulb 4 is turned on, electronic components for constituting the starter circuit or the like installed in the lighting device 5 may malfunction due to heat, and the reliability of the device may be shortened.

Further, if the headlamp is of the reflector-movable type and the lighting device 5 is disposed within the lamp chamber as shown in FIG. 12, the lighting device 5 must be located behind the reflector 3 so as not to interfere the pivotal movement of the reflector 3 when the aiming mechanism is operated. Therefore, the position of the lighting device 5 is extremely restricted.

Further, in the third conventional headlamp shown in FIG. 14, since the lighting device 5 is located outside the lamp chamber, i.e., secured to the rear surface of the back wall of the lamp body, the problem due to heat is not at issue. However, rear part of the headlamp becomes bulky due to the lighting device 5 and, accordingly, the vehicle body is required to have a large space for receiving the headlamp.

Furthermore, generally the lighting device 5 has a weight of 500 g to 1 kg. Since the lighting device 5 is secured to the back wall of the lamp body 1 in the third conventional headlamp shown in FIG. 14, the center of gravity of the headlamp is shifted largely rearwardly. For this reason, the mounting structure of vehicle body for headlamps employing as light source discharge bulb cannot be the same as or similar to that for headlamps employing incandescent type bulb or halide bulb. In other words, headlamps employing as light source discharge bulb must require a special design of mounting structure.

SUMMARY OF THE INVENTION

In view of the foregoing problems and difficulties accompanying the conventional headlamps employing as light source discharge bulb, the present inventors have conceived that a lighting device is mainly constituted by a relatively small and light-weight starter circuit and a big and heavy stabilizer, and both the devices can be separated from each other. The present inventors have considered that, if the relatively small and light-weight starter circuit part is secured to back wall of lamp body whereas the big and heavy stabilizer is secured under the lamp body, any problems including the problem in space for mounting the device to the vehicle body and the problem in the center of gravity can be resolved.

Accordingly, an object of the present invention is to provide a headlamp in which a lighting device for discharge bulb is secured to a predetermined position which is outside a lamp body where there is no affect of heat generating when the discharge bulb is turned on and that the center of gravity of the whole lamp is not largely shifted in the front-rear direction.

The above and other objects can be achieved by a provision of a vehicular headlamp which, according to the present invention, includes a vessel-like lamp body, a front lens coupled to a front opening of the lamp body to define a lamp chamber, a discharge bulb serving as a light source and a reflector for reflecting light beam emitting from the discharge bulb, wherein the lamp body is provided at a back wall thereof an opening part for exchanging the bulb, a starter unit installing therein a starter circuit constituting a part of a discharge bulb lighting device is secured to the opening part of the lamp body, and a stabilizer constituting a part of the discharge bulb lighting device is secured to a bottom part of the lamp body outside the lamp chamber.

According to a second aspect of the invention, the headlamp is of a projection type headlamp having the structure as described above, in which the discharge bulb is mounted to a rear peak of a substantially elliptic reflector and a projection lens is disposed in front of the reflector for distributing frontwardly light beam reflected by the reflector.

According to a third aspect of the invention, the headlamp is of a parabolic type headlamp having the structure as described above, in which the discharge bulb serving as a light source is mounted to a rear peak of a parabolic reflector and a front lens is coupled to the reflector, which lens is provided with lens steps at a rear surface thereof for distributing frontwardly light beam reflected by the reflector.

According to a fourth aspect of the invention, with any one of the structure described above, the stabilizer is mechanically detachably secured to the lamp body.

According to a fifth aspect of the invention, the headlamp includes a vessel-like lamp body having a front opening, a front lens coupled to the front opening of the lamp body to define a lamp chamber, a projection type light source unit which is integrally composed of a substantially elliptic reflector, a discharge bulb mounted to a rear peak of the reflector and a projection lens coupled to a front part of the reflector, a reflection type light source unit disposed adjacent the projection type light source unit within the lamp chamber, which is integrally composed of a parabolic reflector having a front area larger than that of the reflector of the projection type light source unit, and a light source such as incandescent type bulb or halide bulb, wherein the lamp body is provided at a back wall thereof an opening part for exchanging the bulb, a starter unit installing therein a starter circuit constituting a part of a discharge bulb lighting device is secured to the opening part of the lamp body, a recessed portion is formed under a bottom part of the lamp body outside the lamp chamber corresponding to the projection type light source unit, and a stabilizer constituting a part of the discharge bulb lighting device is secured to the recessed portion.

According to a sixth aspect of the invention, in the vehicular headlamp having the structure as described for the fifth aspect of the invention, the stabilizer is mechanically detachably secured to the recessed portion under the lamp body.

With the structure of the headlamp according to the first, second, third and fifth aspect of the invention, although the discharge bulb generates heat when it is turned on and the temperature within the lamp chamber is highly risen up, the temperature of the outside the lamp chamber does not increase so high as compared to the lamp chamber because the outside the lamp chamber communicates with atmosphere. Accordingly, the starter circuit and the stabilizer both constituting a part of the discharge bulb lighting device do not suffer from the problem of heat because they are disposed outside the lamp chamber.

Further, since the hot air goes up within the lamp chamber, the temperature at the lower layer within the lamp chamber is lower than that at the upper layer. Therefore, the stabilizer in not affected more by heat because it is disposed under the bottom of the lamp body to which heat is less applied among the other portions.

Furthermore, the rear part of the lamp body does not become so big although the starter circuit unit is secured to the back wall of the lamp body, because the starter circuit unit is smaller than the stabilizer.

Moreover, when the starter circuit unit is secured to the back wall of the lamp body the center of gravity of the headlamp is shifted rearwardly merely slightly because the weight of the starter circuit unit is much smaller than that of the stabilizer. On the other hand, although the weight of the stabilizer is much larger than that of the starter circuit unit, the center of gravity of the entire headlamp is not much displaced in the front-rear direction of the headlamp because the stabilizer is disposed under the bottom of the lamp body. Rather, because the heavy stabilizer is disposed under the bottom of the lamp body, the center of gravity of the headlamp moves downward and, accordingly, more stability of the gravity can be accomplished.

As described above, because the center of gravity of the headlamp employing the discharge bulb is shifted rearwardly merely slightly compared to that of the headlamp employing incandescent type bulb or halide bulb, the same design of mounting structure for the headlamp employing the discharge bulb can be used as that for the headlamp employing incandescent type bulb or halide bulb.

According to the fifth aspect of the invention the recessed portion is formed under a bottom part of the lamp body outside the lamp chamber corresponding to the projection type light source unit, and the stabilizer constituting a part of the discharge bulb lighting device is secured to the recessed portion. Therefore, the stabilizer projects downward the lamp body merely slightly.

Still further, according to the fourth and sixth aspects of the present invention, since the stabilizer is mechanically detachably secured to the recessed portion under the lamp body, the stabilizer can be exchanged very easily when it is broken.

DESCRIPTION OF THE PREFERRED EMBODIMENTS

The present invention will now be described in detail with reference to accompanying drawings.

Figure 1:
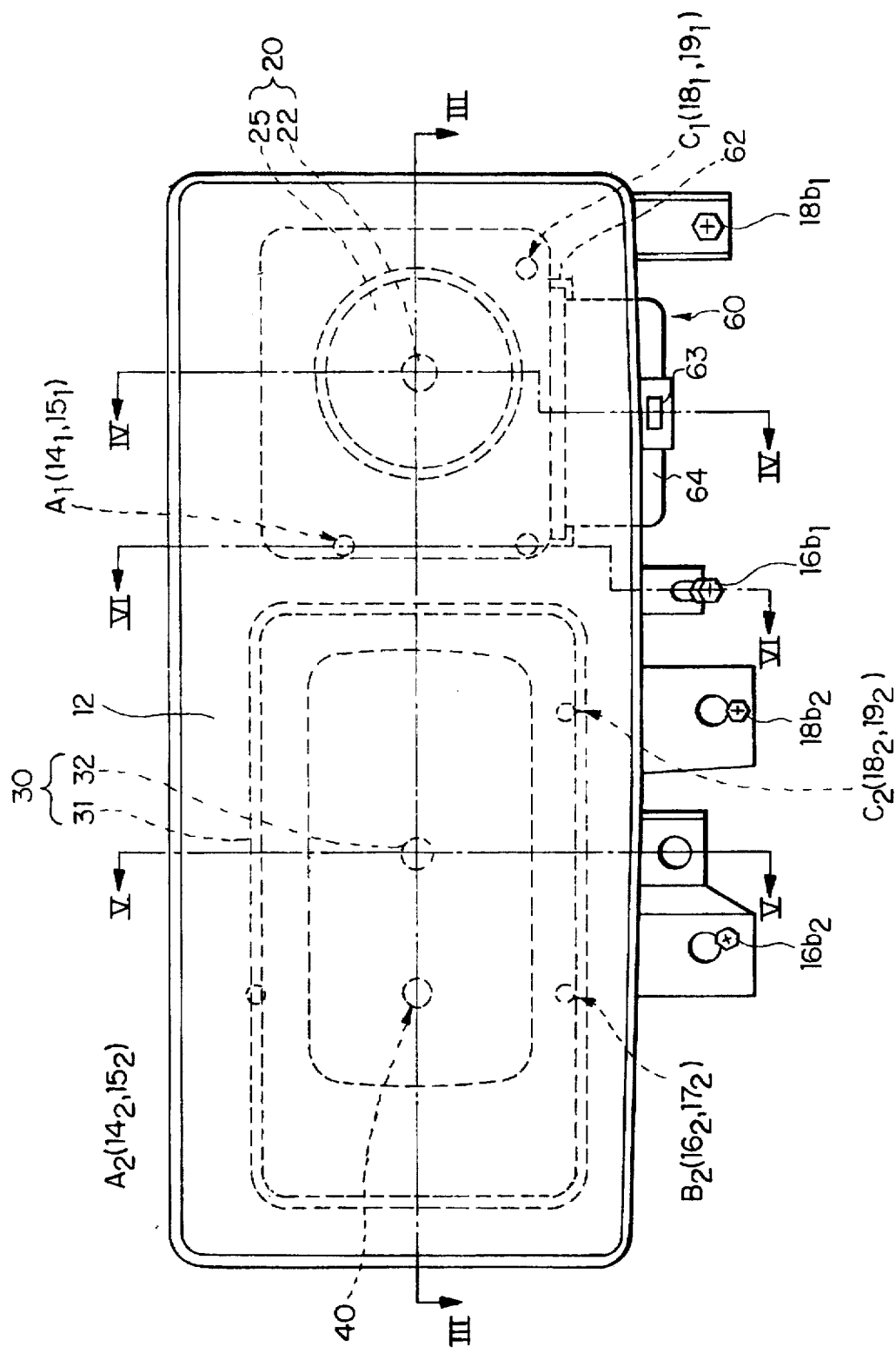
FIG. 1 is a plan view showing a vehicular headlamp integrally formed with a position lamp according to a first embodiment of the present invention.
Figure 2:
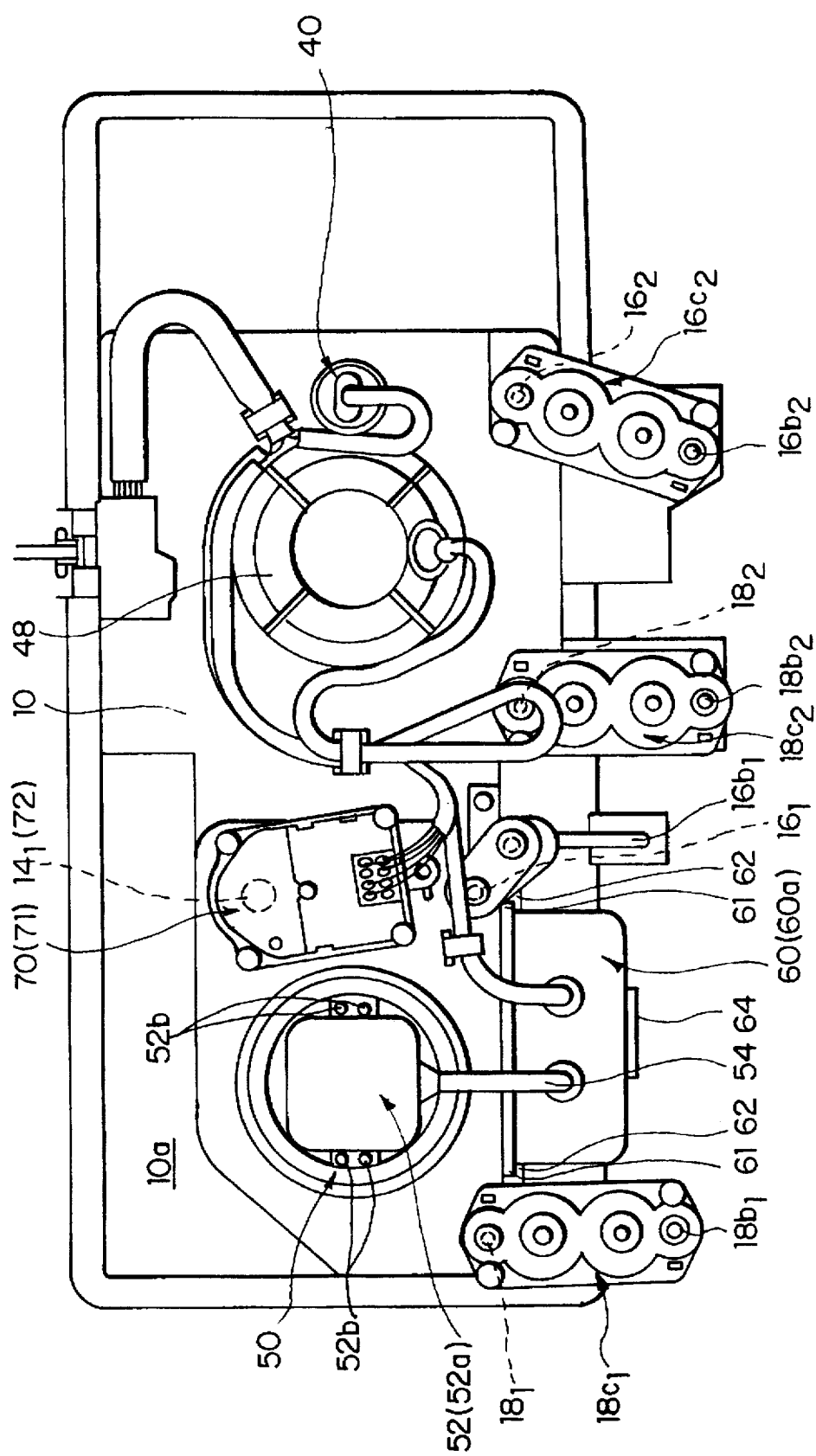
FIG. 2 is a rear view of the headlamp shown in FIG. 1.
Figure 3:
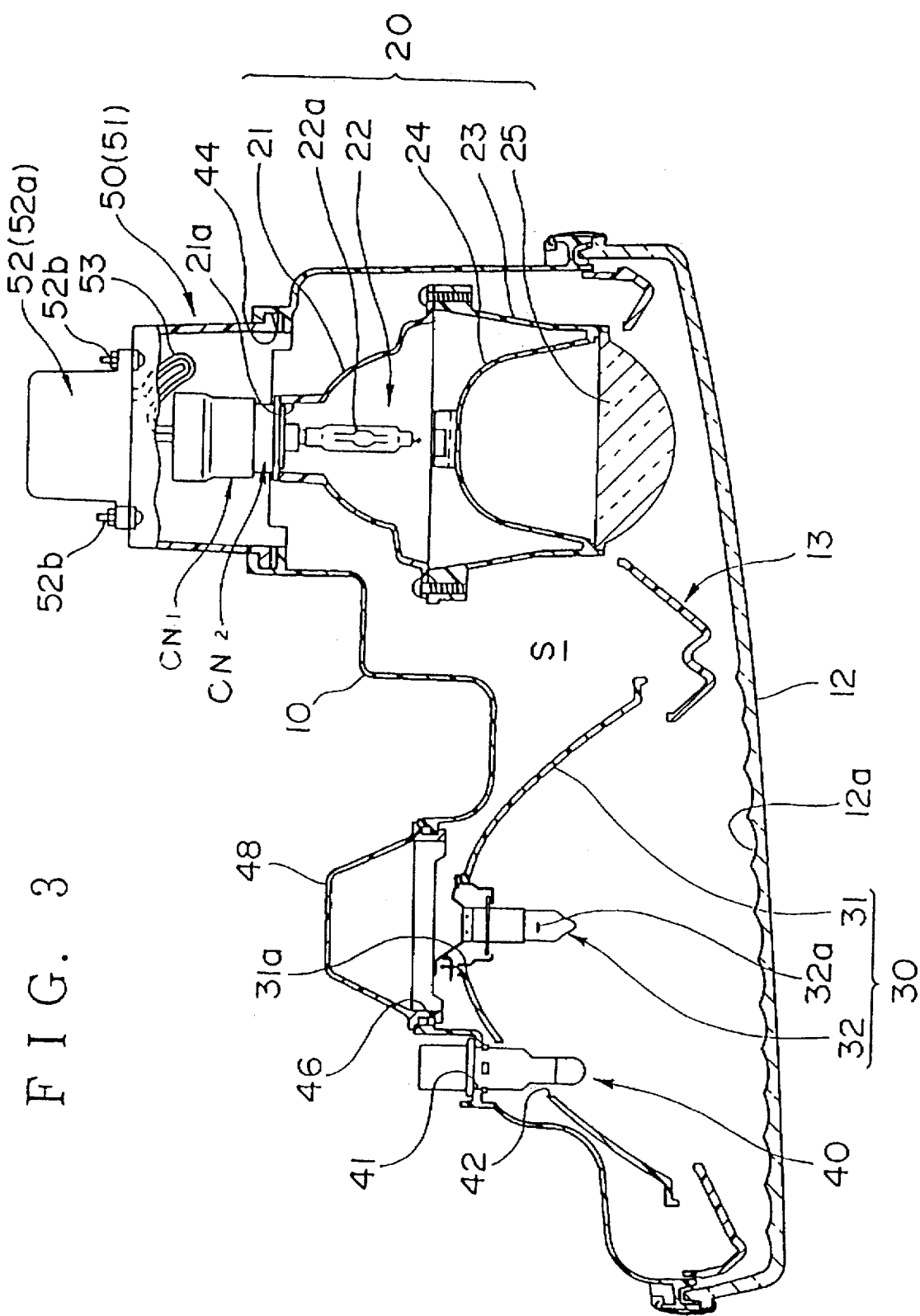
FIG. 3 is a horizontal sectional view of the headlamp shown in FIG. 1 cut along a line III—III of FIG. 1.
Figure 4:
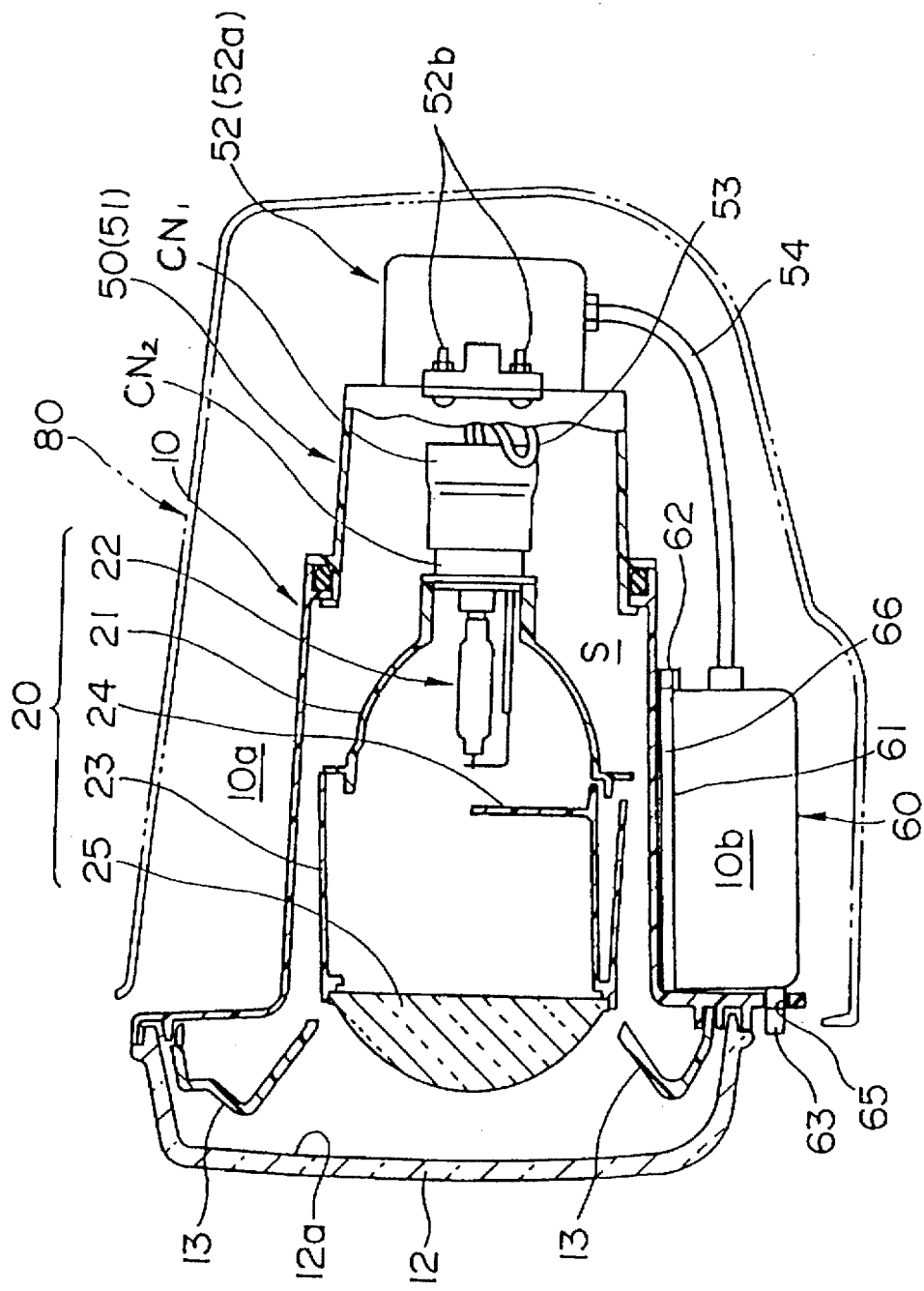
FIG. 4 is a vertical sectional view of the headlamp shown in FIG. 1 cut along a line IV—IV of FIG. 1.
Figure 5:
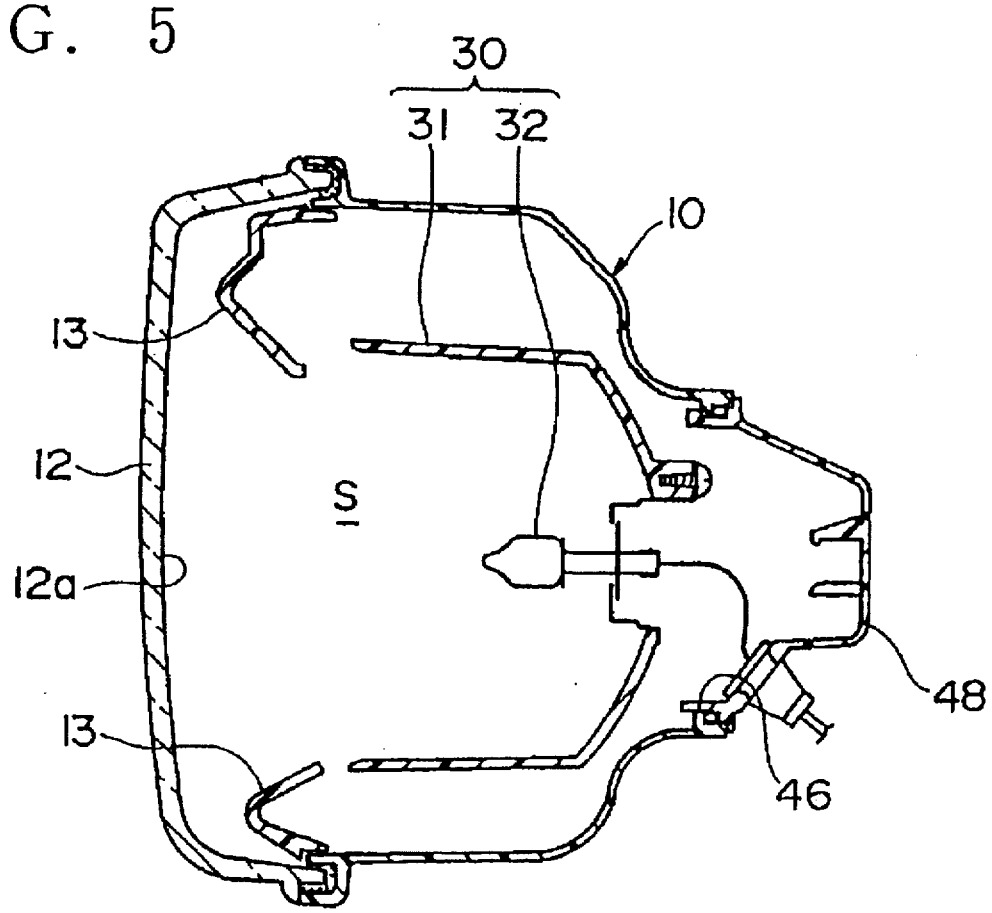
FIG. 5 is a vertical sectional view of the headlamp shown in FIG. 1 cut along a line V—V of FIG. 1.
Figure 6:
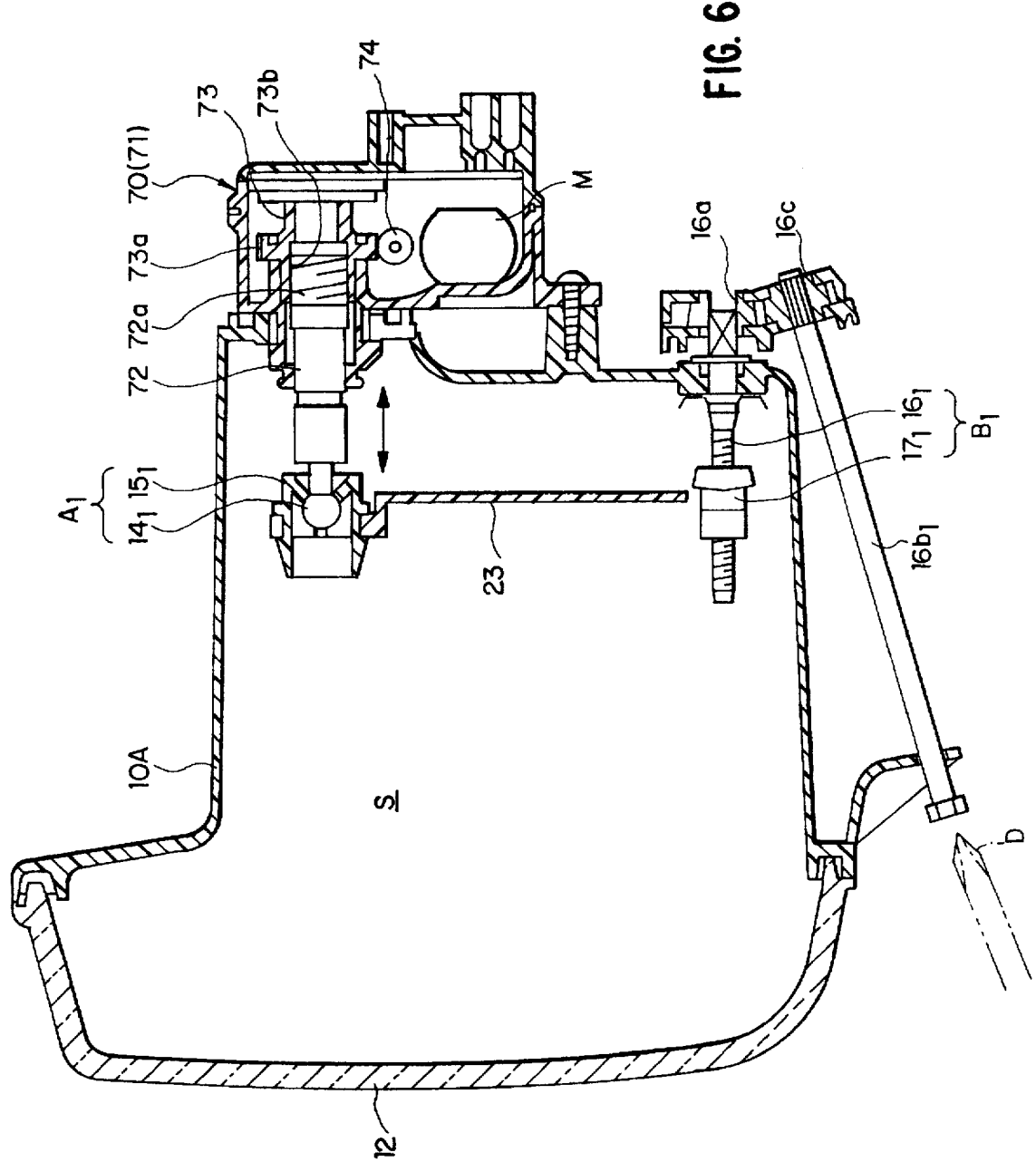
FIG. 6 is a vertical sectional view of the headlamp shown in FIG. 1 cut along a line VI—VI of FIG. 1.
Figure 7:
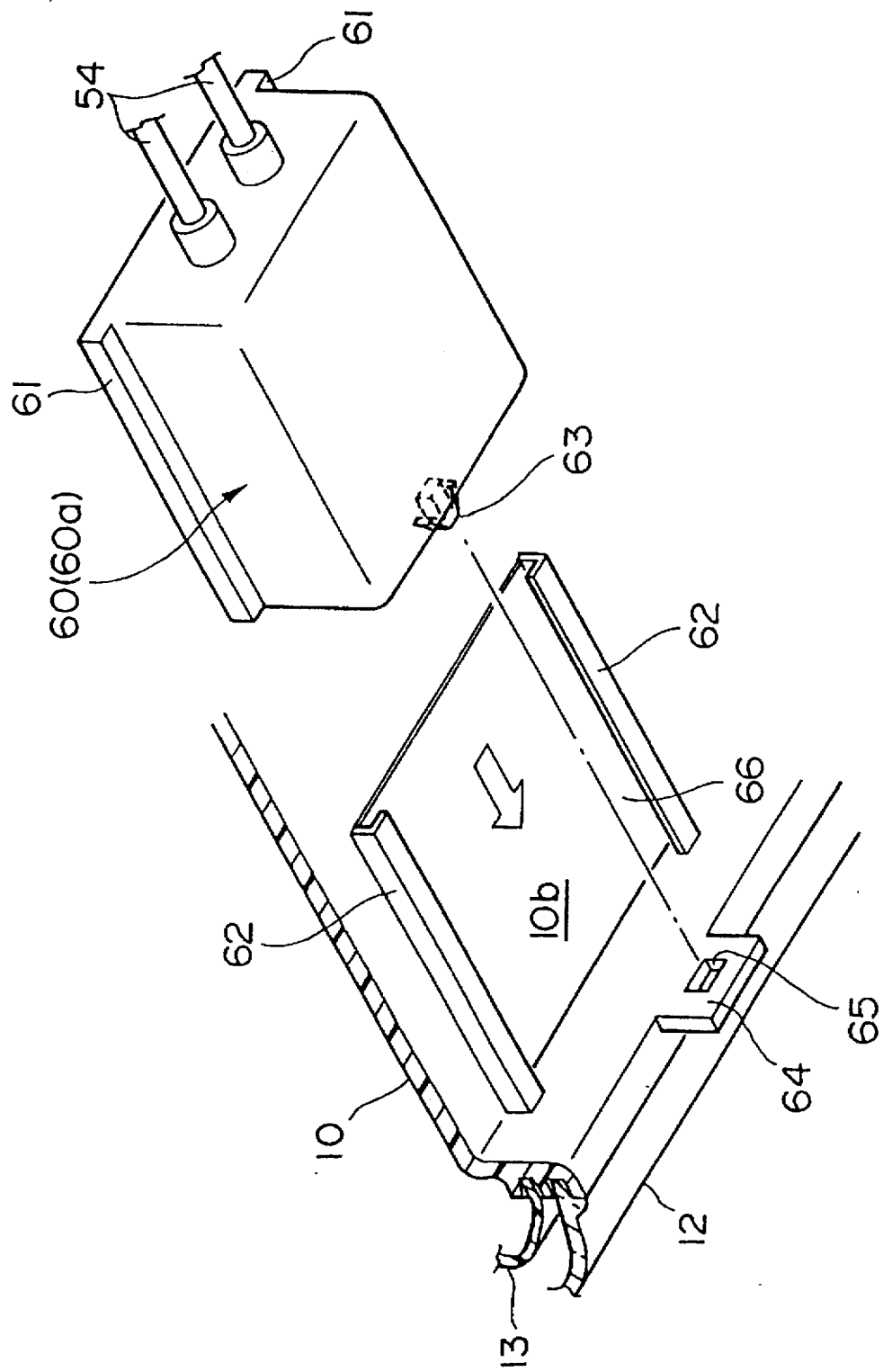
FIG. 7 is a perspective view showing securing members for a stabilizer.

FIGS. 1 through 7 show a headlamp according to a first embodiment of the present invention. Specifically, FIG. 1 is a plan view showing a vehicular headlamp integrally formed with a position lamp according to a first embodiment of the present invention. FIG. 2 is a rear view of the headlamp shown in FIG. 1, FIG. 3 is a horizontal sectional view of the headlamp shown in FIG. 1 cut along a line III—III of FIG. 1, FIG. 4 is a vertical sectional view of the headlamp shown in FIG. 1 cut along a line IV—IV of FIG. 1, FIG. 5 is a vertical sectional view of the headlamp shown in FIG. 1 cut along a line V—V of FIG. 1, FIG. 6 is a vertical sectional view of the headlamp shown in FIG. 1 cut along a line VI—VI of FIG. 1, and FIG. 7 is a perspective view showing securing members for a stabilizer.

As shown in the drawings, the vehicular headlamp is provided with a vessel-like lamp body 10 formed of synthetic resin and a front lens 12 coupled to a front opening of the lamp body 10 to define a lamp chamber S. Inside the lamp body 10, that is, within the lamp chamber S, there are provided a light source unit 20 of a projection type for sub-beam and main beam and a light source unit 30 of a reflection type for main beam disposed adjacent the light source unit 20. Inclination angle of each of the light source units 20 and 30 is independently adjusted by a respective aiming mechanism disposed between a back wall of the lamp body 10 and the light source units 20 and 30, as described later in more detail.

The light source unit 20 of projection type is integrally composed of a substantially elliptic reflector 21 having a bulb mounting hole 21a at a rear peak thereof, a discharge bulb 22 coupled to the bulb mounting hole 21a, a cylindrical lens holder 23 integrally formed with a shade 24 for forming a clear cut line of the sub-beam, and a projection lens 25 integrally formed with the lens holder 23. A light emitting part 22a of an arc tube of the discharge bulb 22 is positioned at a first focal point of the reflector 21, and the shade 24 stands to position at a second focal point of the reflector 21 and a rear focal point of the projection lens 25, so that the shadow of the shade 24 forms a light distribution pattern for the sub-beam having a predetermined clear cut line, that is, a part of the main beam pattern.

On the other hand, the light source unit 30 of reflection type is composed of a parabolic reflector 31 having a bulb mounting hole 31a at a rear peak thereof and a halide type bulb (or incandescent type bulb) 32 is coupled to the bulb mounting hole 31a. A filament 32a of the halide bull) 32 locates in the vicinity of a focal point of the reflector 31. Substantially parallel light beam reflected by the reflector 31 and directing frontward is distributed frontward in the predetermined direction by light distribution control steps (diffusion steps) 12 formed on a rear surface of the front lens, so that a part of the predetermined light distribution pattern for the main beam is formed, to thereby form the complete light distribution pattern cooperatively with the light distribution pattern formed by the light source unit 20 of projection type.

As shown in FIGS. 1 and 6, the light source unit 20 of projection type is inclinably supported by an aiming mechanism constituted by a stationary pivot fulcrum $A_1$ consisting of a ball part $14_1$ and a bearing part $15_1$, a first movable fulcrum $B_1$ consisting of an aiming screw $16_1$ and a nut member $17_1$ engaging with the aiming screw $16_1$ and supported on a back surface of the reflector 21, and a second movable fulcrum $C_1$ consisting of an aiming screw $18_1$ and a nut member $19_1$ engaging with the aiming screw $18_1$ and supported on a back surface of the reflector 21. Similarly, the light source unit 30 of reflection type is inclinably supported by an aiming mechanism constituted by a stationary pivot fulcrum $A_2$ consisting of a ball part $14_2$ and a bearing part $15_2$, a first movable fulcrum $B_2$ consisting of an aiming screw $16_2$ and a nut member $17_2$ engaging with the aiming screw $16_2$ and supported on a back surface of the reflector 21, and a movable a second movable fulcrum $C_2$ consisting of an aiming screw $18_2$ and a nut member $19_2$ engaging with the aiming screw $18_2$ and supported on a back surface of the reflector 21. When the aiming screws $16_1$ ($16_2$) and $18_1$ ($18_2$) are operated to rotate, the light emitting from the light sources of the light source units 20, 30 are adjusted in both the vertical and horizontal directions.

FIG. 6 shows more specific structure of the stationary pivot fulcrum $A_1$ and the movable fulcrum $B_1$ constituting the light source unit 20 of projection type. The stationary pivot fulcrum. $A_1$ is composed of the ball part $14_1$ secured to the back wall of the lamp body (specifically, a unit case 71 connected to the back wall of the lamp body, which case accommodates therein a leveling mechanism 70 described later) and the bearing part $15_1$ for supporting the ball part $14_1$, which is disposed at the projection type light source unit 20 side. The movable fulcrum $B_1$ is composed of the aiming screw $16_1$ for adjusting the lamp in the vertical direction and the nut member $17_1$ engaging with the aiming screw $16_1$ and disposed at the light source unit 20 of projection type side. The bearing part $15_1$ and the nut member $17_1$ engage with the lens holder 23 of the light source unit 20 of projection type.

A gear 16a mounts to the axis of the aiming screw $16_1$ at a projecting distal end thereof projecting toward the back wall of the lamp body. On the other hand, there is provided an operation rod $16b_1$ extending in substantially parallel with the aiming screw $16_1$ along the bottom of the lamp body 10, and a gear 16c mounts to the axis of the operation rod $16b_1$ at a rear distal end thereof. The gear 16a of the aiming screw $16_1$ engages with the gear 16c of the operation rod $16b_1$. With the gear engagement structure, when the operation rod $16b_1$ is operated to rotate, the aiming screw $16_1$ is then rotated, thereby to pivot the light source unit 20 in the vertical direction, so that the optical axis of the light beam is adjusted.

The structures of the stationary pivot fulcrum $A_2$ and the movable fulcrums $B_2$, $C_2$ for constituting the light source unit 30 are similar to those of the stationary pivot fulcrum $A_1$ and the movable fulcrums $B_1$, $C_1$ for constituting the light source unit 20. That is, there is provided an operation rod $16b_2$ extending in substantially parallel with the aiming screw $16_2$ for vertical adjustment forming a part of the movable fulcrum $B_2$ ($C_2$), and the aiming screw $16_2$ ($18_2$) and the operation rod $16b_2$ are operatively engaged with each other through a gear mechanism $16c_2$. When the operation rod $16b_2$ ($18b_2$) is operated to rotate, the aiming screw $16_2$ ($18_2$) is then rotated, thereby to pivot the light source unit 30 in the vertical (vertical and horizontal) direction, so that the optical axis of the light beam is adjusted.

A leveling mechanism 70 shown in FIGS. 2 and 6 holds the optical axis of the light source unit 20 of projection type in parallel. The correlation of the weight of cargo on the vehicle with the optical axis thereof can be previously known, as when the weight of cargo is very large the optical axis of the headlamp is inclined up. Therefore, the stationary pivot fulcrum $A_1$ is previously adjusted by operating the leveling mechanism 70 in the front-rear direction, i.e., along an arrow shown in FIG. 6, in accordance with the cargo weight.

As shown in FIG. 6, the leveling mechanism 70 is housed in a unit case 71 secured to the back wall of the lamp body 10. The leveling mechanism 70 is constituted by a rod 72 which is provided at a distal end thereof with the ball part $14_1$ serving as a part of the stationary pivot fulcrum $A_1$. The rod 72 penetrates the back wall of the lamp body 10 and slidably supported by the unit case 71 while preventing from rotating with respect to the case. An outer cylinder 73 having a wheel 73a is disposed coaxially with the rod 72 and rotatably supported by the unit case 71. The outer cylinder 73 is formed at an inner surface thereof with a female threaded section 73b which engages with the male threaded section 72a disposed at the rear end of the rod 72. The wheel 73a engages with a worm gear 74 rotated by a motor M. When the motor M rotates to drive the rod 72 to move back and forth, the stationary pivot fulcrum $A_1$ moves back and forth so that the optical axis of the light source unit 20 of projection type inclines up and down.

A bulb 40 for a position lamp shown in FIGS. 1 through 3 is coupled to a bulb mounting hole 41 formed in the back wall of the lamp body 10 adjacent the light source unit 30 of reflection type, and the bulb 40 protrudes frontward from an opening 42 formed in the parabolic reflector 31. The reflector 31 also performs as a reflector for the position lamp.

An extension reflector 13 shown in FIGS. 3, 4 and 5 is disposed between the front opening part of the lamp body 10 and the front lens 12 at a specific position that the extension reflector extends to close a gap between the front opening part of the lamp body 10 and the light source units 20, 30. A front surface of the extension is subjected to an aluminum deposition treatment so that the entire lamp chamber S appears the same metallic color as the reflector 31. Therefore, the external appearance of the headlamp is thus improved.

As shown in FIG. 3, an opening section 44 is formed in the back wall of the lamp body 10 at the position of the light source unit 20 of projection type, and a back cover 50 having a closed configuration is connected to close the opening section 44 by means of a bayonet engagement in such a manner that the back cover 50 can be detached from the lamp body by rotating it.

The back cover 50 is composed of a cylindrical cover body 51 and a starter circuit unit 52 secured to the body 51. The starter circuit unit 52 is provided with a unit case 52a formed of aluminum die-casting and a starter circuitry installed integrally in the unit case 52a. The starter circuitry is a part of the lighting device for the discharge bulb and actuates discharge between electrodes of an arc tube by applying high voltage to the discharge bulb 22. A power supply code 53 extends from the starter circuitry installed in the unit case 52a into the cover body 51. A power supply connector CN1 connecting to the code 53 is connected to a bulb connector CN2 which is integrally formed with a rear end part of the discharge bulb 22. The cover body 51, which is formed of synthetic resin to reduce the weight, is secured to the unit case 52a by screws 52b.

As described above, the starter circuit unit 52 is integrally formed with the back cover 50 closing the opening section 44 for exchanging the bulb and disposed outside the lamp chamber S. Accordingly, heat of high temperature within the lamp chamber S generated by actuating the bulb 22 is hardly transmitted to the starter circuit unit 52. Therefore, the headlamp does not suffer from the problems in that the starter circuit installed within the unit case 52a, i.e., electronic components constituting the starter circuit, may malfunction due to heat or durability of the starter circuit is shortened.

On the other hand, the vertical height of the lamp chamber S at the light source unit 20 of projection type side is made smaller than that at the reflection type light source unit 30 side, because the dimension of the light source unit 20 is smaller that the light source unit 30. More specifically, because the area viewing from the front of the substantially elliptic reflector 21 constituting the light source unit 20 of projection type is smaller than that of the parabolic reflector 31 constituting the reflection type light source unit 30, the distance between the upper wall and the lower wall of the lamp body 10 at the projection type light source unit 20 side is designed smaller than the distance between the upper wall and the lower wall of the lamp body 10 at the reflection type light source unit 30 side. Accordingly, as shown in FIGS. 2, 4 and 6, a couple of recessed portions 10a and 10b are formed at the upper and lower portions, respectively, of the lamp body 10 at the projection type light source unit 20 side. Within the lower recessed portion 10b, there is provided a stabilizer 60 for stably maintaining the discharge, which performs as a part of the lighting device for the discharge bulb. As shown in FIG. 4, a code 54 connects the stabilizer 60 to the starter circuit unit 52.

Because the temperature at the lower layer of the lamp chamber S is lower than that at the upper layer thereof as mentioned above, the lower wall of the lamp body is the most part among the outer periphery of the lamp body, which is not affected by heat generated by the discharge bulb 22. Therefore, the stabilizer 60, which is secured to the lower wall of the lamp body outside the lamp chamber S, is hardly affected by heat. For the reason, the headlamp does not suffer from the problems in that the electronic components installed in the stabilizer 60 may malfunction due to heat or durability of the stabilizer 60 may be shortened.

As shown in an enlarged view of FIG. 7, a pair of rails 62, 62 of a dovetail type extending in the front-rear direction is provided on the lower wall of the lamp body 10 facing the recessed portion 10b and just under the light source unit 20 of projection type. A stopper plate 64 having a tongue-shape forming thereon an engaging hole 65 projects downward from the seal groove forming wall facing a region sandwiched by the rails 62, 62. On the other hand, the case 60a of the stabilizer 60 is provided with a pair of flange sections 61, 61 for engaging with the rails 62, 62, and the case 60a is also provided at a front end thereof an anchor-shaped hook 63 having a flexible piece. When the flange sections 61 engage with the rails 62 from the rear side of the headlamp and then the stabilizer 60 slides in the rails frontwardly, the front end of the stabilizer 60 comes into abutment against the stopper plate 64 and the hook 63 hangs on the engaging hole 65 to thereby prevent from detaching. For the operation, the stabilizer 60 is securely engaged with and held by the lower wall of the lamp body 10. According to the first embodiment of the invention thus structured, the stabilizer can be readily secured to the recessed portion 10b formed under the lamp body 10.

When the stabilizer is to be detached, the flexible piece of the hook 63 is depressed into the engaging hole by a finger and, under this condition, the stabilizer 60 can slide back easily.

In the embodiment of the invention, a heat shield plate 66 formed of a heat insulating material such as iron, ceramic, silicone, asbestos or the like is laid in the lower region of the lamp body 10 sandwiched by the rails 62, 62, for further shielding heat to the stabilizer 60.

As shown in FIG. 4, an electromagnetic wave shield panel 80 made of metal is secured to the vehicle body for covering the headlamp. The electromagnetic wave shield panel 80 shields the electromagnetic wave generated by the stabilizer 60, the starter circuit unit 52, discharge bulb 22 and codes 53, 54 connecting to one another to thereby avoid error in the various kinds of electronic control circuits and the noise of the radio receiver.

On the other hand, when the stabilizer 60 is secured within the lower recessed portion 10b formed under the lamp body 10, only the lower end of the stabilizer protrudes from the lower surface of the lamp body 10 merely slightly. For the reason, since the stabilizer 60 is hardly seen when the headlamp is viewed from the front, sides and back, the external appearance of the headlamp is not deteriorated even by stabilizer 60.

Further, the stabilizer 60 itself is heavy because it houses therein the electronic components such as core-and-coils, resistors, capacitors and the like, and the core-and-coils are particularly heavy. However, since the stabilizer 60 is secured just under the lamp body 10, the center of gravity of the headlamp moves downward and, accordingly, more stability of the center of gravity can be accomplished.

As shown in FIGS. 3 and 5, the back wall of the lamp body 10 is provided with an opening section 46 for exchanging the bulb 32 at the reflection type light source unit 30 side thereof, and a back cover 48 detachably engages with the opening section 46 by means of the bayonet structure.

Figure 8:
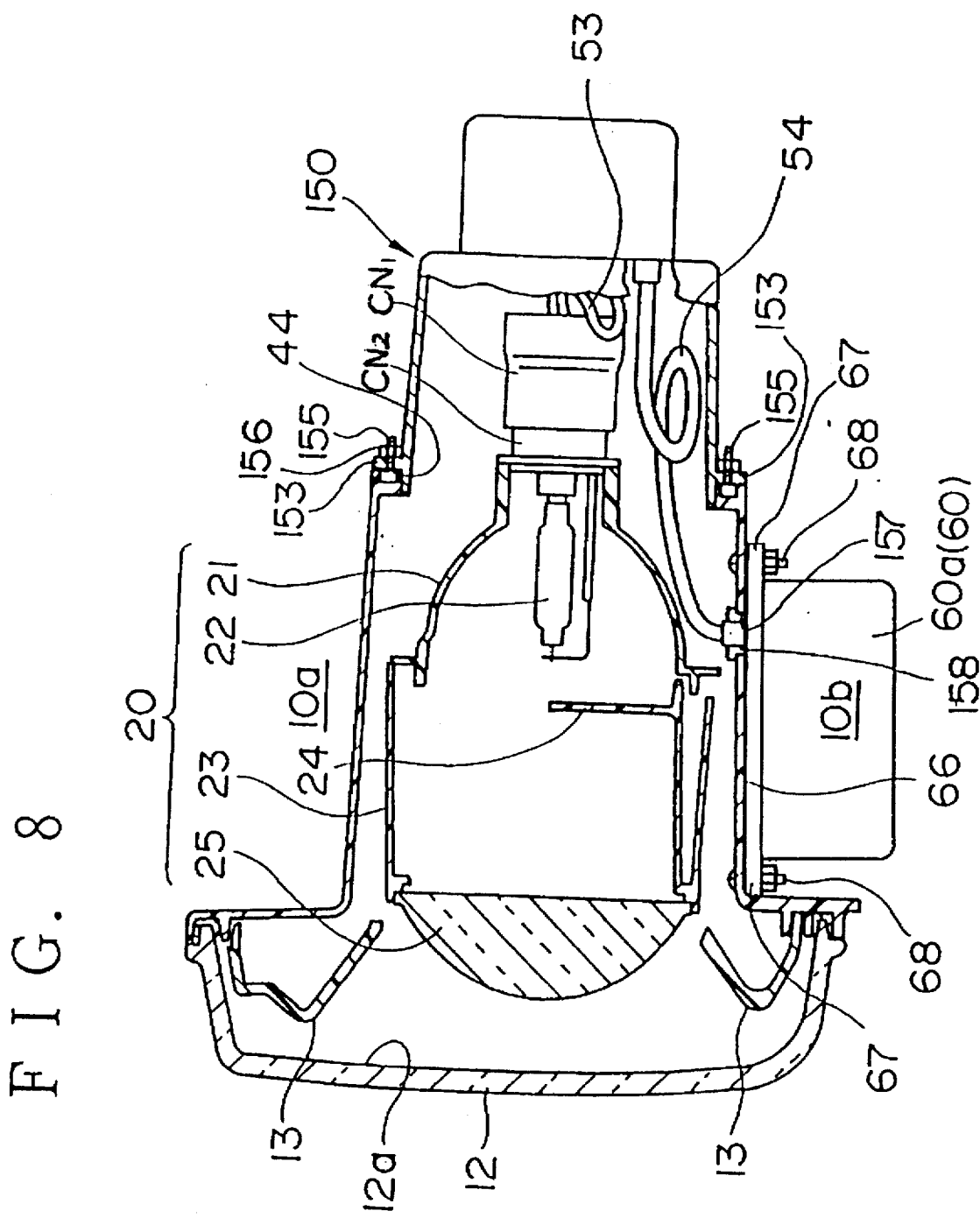
FIG. 8 is a vertical sectional view of an essential part of a vehicular headlamp according to a second embodiment of the present invention, which corresponds to FIG. 4 for the first embodiment.
Figure 9:
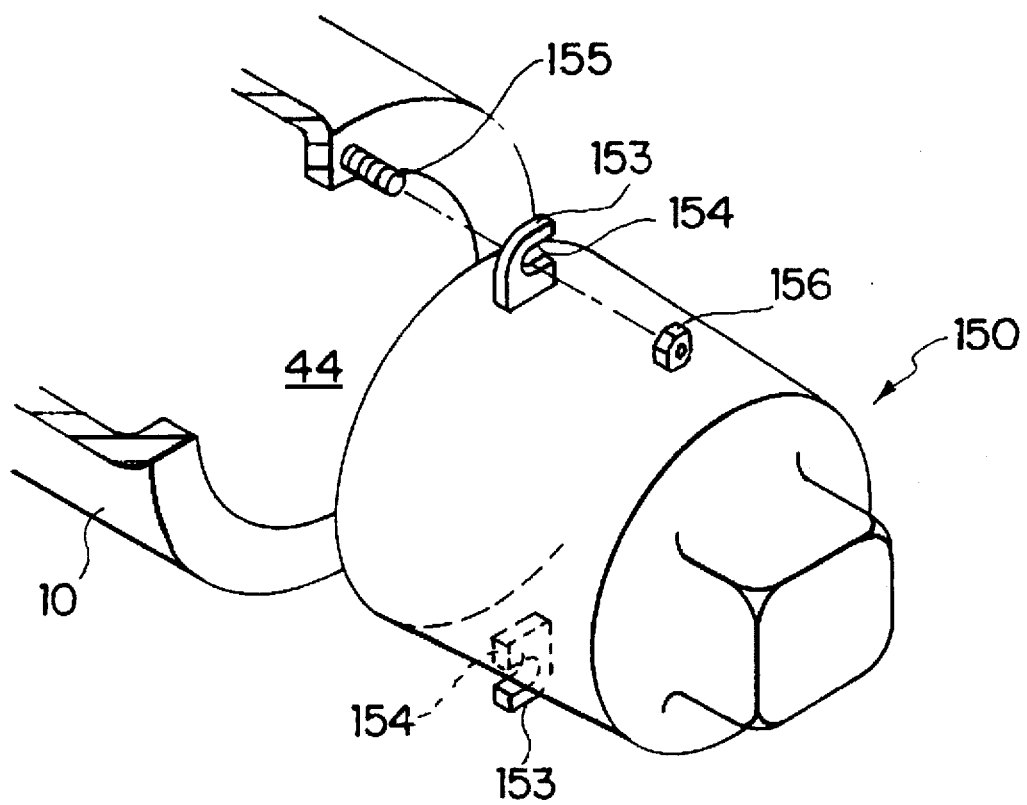
FIG. 9 is a perspective view of a securing section of a back cover of the headlamp shown in FIG. 8.
Figure 10:
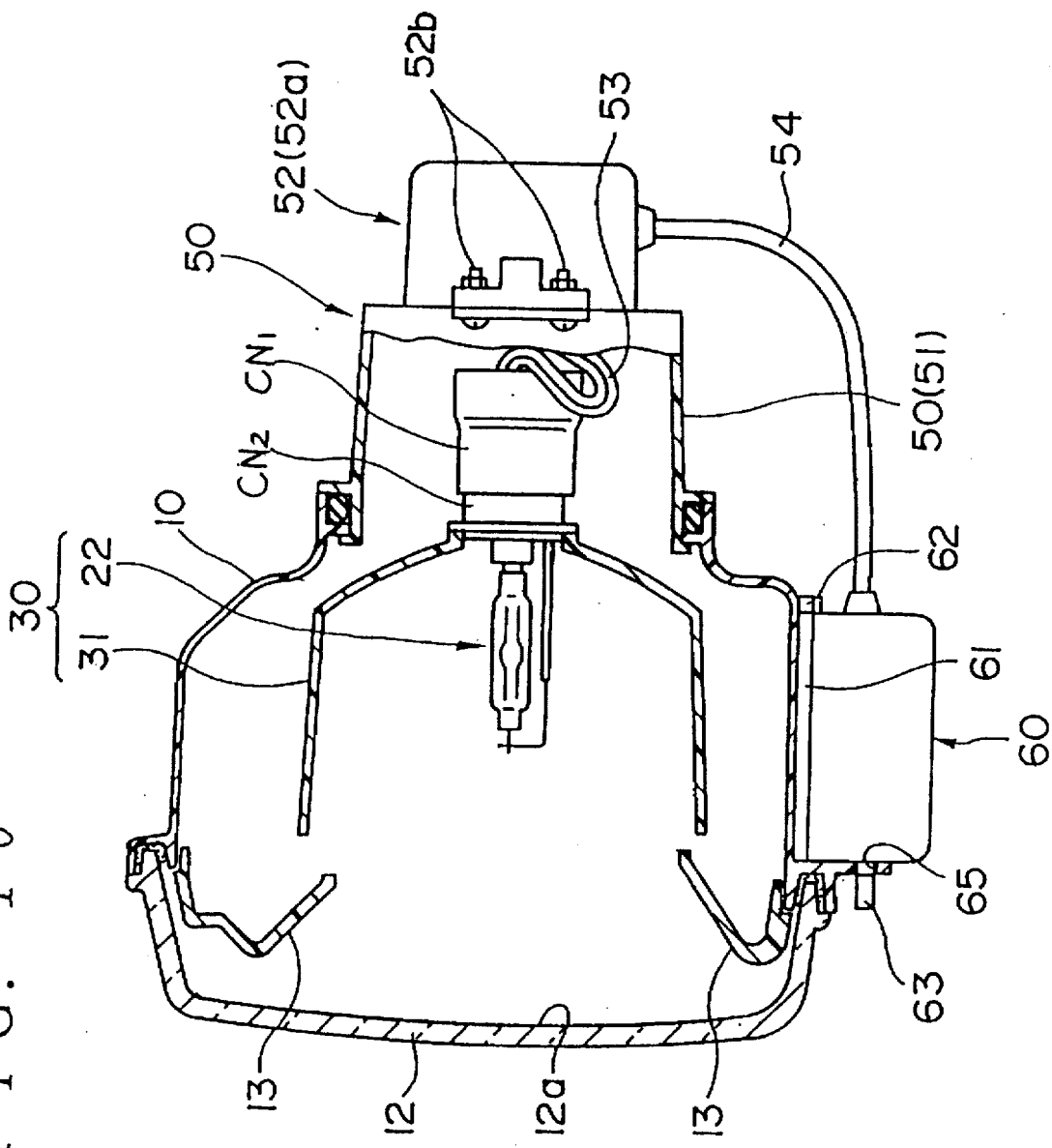
FIG. 10 is a vertical sectional view of an essential part of the headlamp shown in FIG. 8, which corresponds to FIG. 5 for the first embodiment.

FIGS. 8 through 10 show a headlamp according to a second embodiment of the present invention. Specifically, FIG. 8 is a vertical sectional view of an essential part of a vehicular headlamp according to the second embodiment of the present invention, which corresponds to FIG. 4 for the first embodiment; FIG. 9 is a perspective view of a securing section of a back cover of the headlamp shown in FIG. 8; and FIG. 10 is a vertical sectional view of an essential part of the headlamp shown in FIG. 8, which corresponds to FIG. 5 for the first embodiment.

In the structure of the first embodiment described above, the starter circuit unit 52 installing therein the starter circuitry is housed in the unit case 52a formed of aluminum die-casting, and the starter circuit unit 52 is secured by screws to the back cover body 51 formed of synthetic resin to integrally form a back cover 50. However, according to the second embodiment, the cylindrical back cover body and the cup-shaped starter circuit unit case are integrally formed of aluminum die-casting for installing therein the starter circuitry. Thus, the number of parts for forming a combined back cover 150 is reduced, which reduces the manufacturing cost.

Further, the combined back cover 150 installing therein the starter circuitry thus provided is formed with a pair of brackets 153, 153 at an outer periphery of an opening which couples to the opening section 44 formed in the back wall of the lamp body 10. And the combined back cover 150 is coupled to the opening section 44 by screws 155 and nuts 156, which screws are embedded in upper and lower portions of the opening periphery.

On the other hand, since the bracket 153 is formed with a notch 154 instead of threaded hole, the back cover 152 can be detached from the opening section 44 without completely disengaging the nut 156 from the screw 155.

Moreover, in the first embodiment, the stabilizer 60 slides along the rail 62 to be mounted under the lower wall of the lamp body 10 and the hook 63 engages with the engaging hole 65 so that the stabilizer 60 is prevented from detaching. According to the second embodiment of the invention, however, the stabilizer 60 is secured to the lower wall of the lamp body 10 in such a manner that a bracket 67 extending from the stabilizer case 60a is secured by screws 68 to the lower wall of the lamp body.

Still further, the power supply code 54 extending from the stabilizer 60 to the starter circuit accommodated in the back cover 150 is drawn through a code through hole 157 formed in the lamp body 10 to the inside the lamp body 10 and then connected to the starter circuit in the back cover 150. Owing to the structure, water resistivity of the code 54 is improved. As shown in FIG. 8, a water-proof grommet 158 is fitted in the code through hole 156 to more enhance the water resistivity of the code 54.

The first embodiment described above employs a halide bulb 32 as a light source of the reflection type light source unit 30. However, in the second embodiment, as shown in FIG. 10, a discharge bulb 22 is employed also as a light source of the reflection type light source unit 30. Further, the starter circuit unit 52 is integrally secured to the back cover body 51 and the stabilizer 60 is secured under the lower wall of the lamp body 10 outside the lamp chamber and just under the reflection type light source unit 30.

Figure 11:
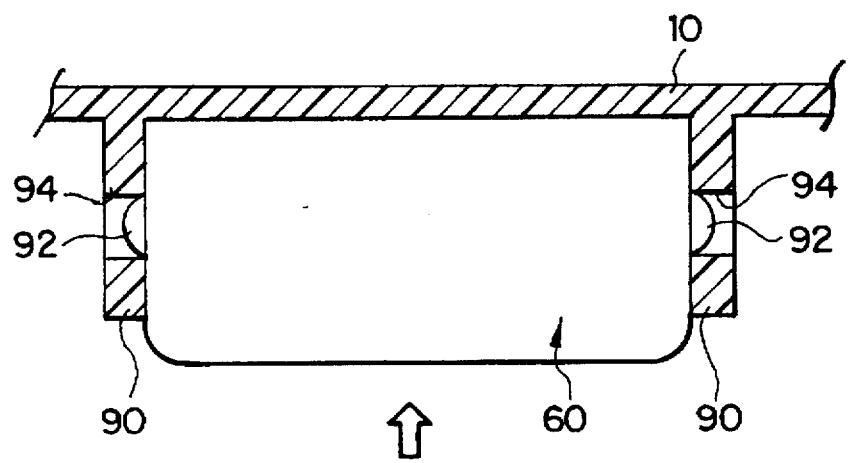
FIG. 11 is a vertical sectional view of an essential part of a vehicular headlamp according to an arrangement of the securing structure of the stabilizer of the present invention.
Figure 12:
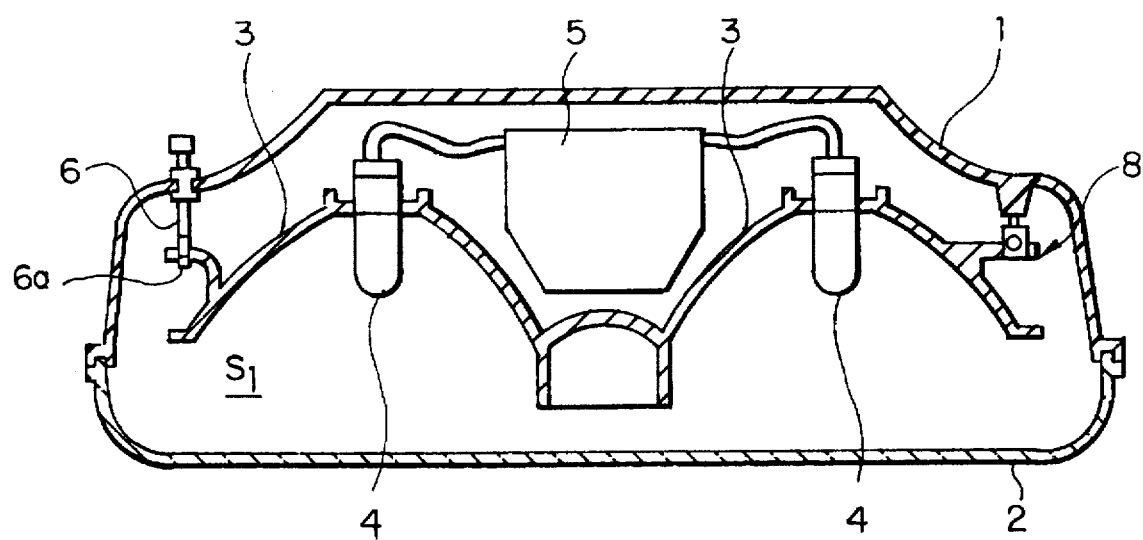
FIG. 12 is a horizontal sectional view of a first conventional headlamp.
Figure 13:
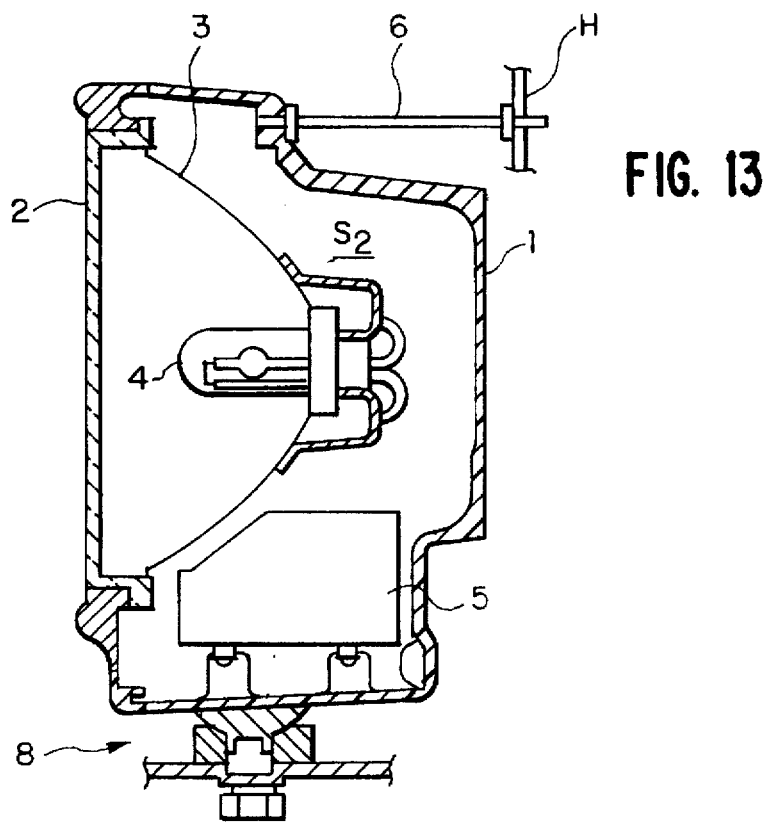
FIG. 13 is a vertical sectional view of a second conventional headlamp.
Figure 14:
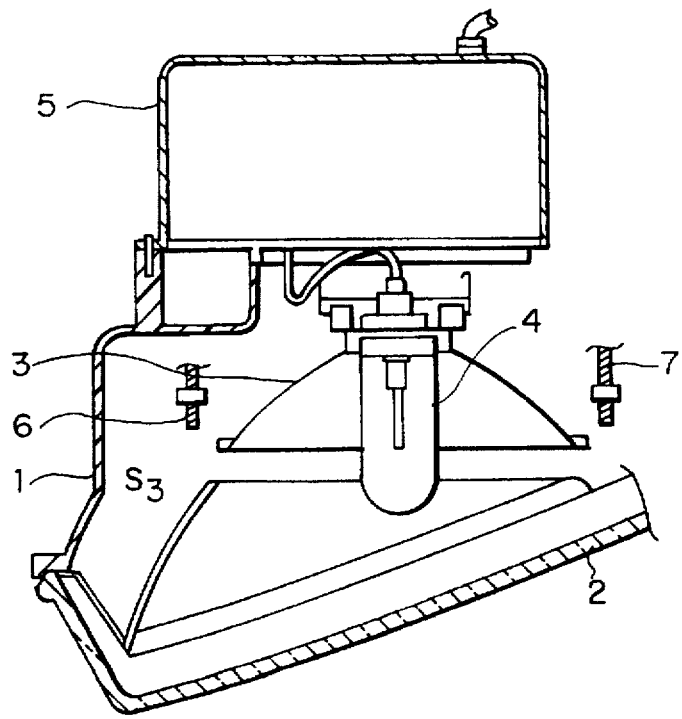
FIG. 14 is a horizontal sectional view of a third conventional headlamp.

In the second embodiment, the stabilizer 60 is secured by screws to the lamp body 10 of the headlamp at the projection type light source unit 20 side. However, as shown in FIG. 11, the lower wall of the lamp body 10 may be provided with a couple of flanges 90, 90 extending downward for abutting against the side surfaces of the stabilizer 60, and the flanges 90, 90 are formed with engaging holes 94, 94. On the other hand, a couple of projections 92, 92 are formed on the side surfaces of the stabilizer 60. The projection 92 of the stabilizer 60 engages with the respective engaging hole 94 of the flange 90 by means of the convex-concavo lance engagement, so that the stabilizer 60 is secured under the lamp body 10.

As described above, according to the structure of the headlamp according to the first, second, third and fifth aspect of the invention, although the discharge bulb generates heat when it is turned on and the temperature within the lamp chamber is highly risen up, the temperature of the outside the lamp chamber does not increase so high as compared to the lamp chamber because the outside the lamp chamber communicates with atmosphere. Accordingly, the starter circuit and the stabilizer both constituting a part of the discharge bulb lighting device do not suffer from the problem of heat because they are disposed outside the lamp chamber.

Further, since the hot air goes up within the lamp chamber, the temperature at the lower layer within the lamp chamber is lower than that at the upper layer. Therefore, the stabilizer in not affected more by heat because it is disposed under the bottom of the lamp body to which heat is less applied among the other portions.

Furthermore, the rear part of the lamp body does not become so big although the starter circuit unit is secured to the back wall of the lamp body, because the starter circuit unit is smaller than the stabilizer.

Moreover, when the starter circuit unit is secured to the back wall of the lamp body the center of gravity of the headlamp is shifted rearwardly merely slightly because the weight of the starter circuit unit is much smaller than that of the stabilizer. On the other hand, although the weight of the stabilizer is much larger than that of the starter circuit unit, the center of gravity of the entire headlamp is not much displaced in the front-rear direction of the headlamp because the stabilizer is disposed under the bottom of the lamp body. Rather, because the heavy stabilizer is disposed under the bottom of the lamp body, the center of gravity of the headlamp moves downward and, accordingly, more stability of the gravity can be accomplished.

As described above, because the center of gravity of the headlamp employing the discharge bulb is shifted rearwardly merely slightly compared to that of the headlamp employing incandescent type bulb or halide bulb, the same design of mounting structure for the headlamp employing the discharge bulb can be used as that for the headlamp employing incandescent type bulb or halide bulb.

According to the fifth aspect of the invention, the recessed portion is formed under a bottom part of the lamp body outside the lamp chamber corresponding to the projection type light source unit, and the stabilizer constituting a part of the discharge bulb lighting device is secured to the recessed portion. Therefore, the stabilizer projects downward the lamp body merely slightly.

Still further, according to the fourth and sixth aspects of the present invention, since the stabilizer is mechanically detachably secured to the recessed portion under the lamp body, the stabilizer can be exchanged very easily when it is broken.

It should be understood that the form of the invention herein shown and described is to be taken as a preferred example of the invention and that various changes in the shape, size and arrangement of parts may be resorted to without departing from the spirit of the invention or the scope of the subjoined claims. For example, the cylindrical member may be circular, rectangular, or polygonal in cross section.

What is claimed is:

1. A vehicle headlamp, comprising:
a vessel-shaped lamp body having a front opening and a bottom wall comprising a recessed portion wherein;
a front lens coupled to said front opening of said lamp body;
a lamp chamber defined by said lamp body and said front lens;
a discharge bulb as a light source disposed in said lamp chamber;
a reflector disposed in said lamp chamber; and
a lighting device for said discharge bulb, said lighting device comprising a stabilizer and a starter circuit unit installing therein electronic components, said stabilizer and said starter circuit unit are separately disposed outside said lamp chamber, said stabilizer being detachably secured within said recessed portion of said lamp body.

2. The vehicular headlamp according to claim 1, wherein said lamp body comprises an opening section formed in a back wall thereof for exchanging said discharge bulb, and said starter circuit unit is detachably secured to said opening section of said lamp body.

3. The vehicular headlamp according to claim 1, wherein the headlamp is of a projection type in which said reflector is substantially elliptic, said discharge bulb mounts to a rear peak of said reflector, and said front lens consists of a projection lens.

4. The vehicular headlamp according to claim 1, wherein the headlamp is of a reflection type in which said reflector is parabolic, said discharge bulb mounts to a rear peak of said parabolic reflector, and said front lens comprises lens steps formed on a rear surface thereof.

5. The vehicular headlamp according to claim 1, wherein said starter circuit unit comprises a unit case formed of aluminum die-casting and a starter circuitry installed integrally in said unit case.

6. The vehicular headlamp according to claim 5, wherein said starter circuit unit further comprises a cylindrical cover body to which unit case of said starter circuit unit is secured.

7. The vehicular headlamp according to claim 6, wherein said cover body of said starter circuit unit is formed of synthetic resin, and said unit case of said starter circuit unit is secured to said cover body by screws.

8. A vehicular headlamp, comprising:
a vessel-shaped lamp body having a front opening and a projection type light source unit side;
a front lens coupled to said front opening of said lamp body;
a lamp chamber defined by said lamp body and said front lens;
discharge bulb as a light source disposed in said lamp chamber;
a reflector disposed in said lamp chamber; and
a lighting device for said discharge bulb, said lighting device comprising a stabilizer and a starter circuit unit installing therein electronic components, said stabilizer and said starter circuit unit are separately disposed outside said lamp chamber,
wherein there is formed a recessed portion at a lower portion of said lamp body under said projection type light source unit side, and said stabilizer is secured within said recessed portion.

9. The vehicular headlamp according to claim 8, wherein said lamp body comprises a pair of rails of a dovetail type extending in the front-rear direction thereof facing said recessed portion, said rails are formed on the lower portion of said lamp body Just under said projection type light source unit, and a stopper plate having a tongue-shape forming thereon an engaging hole projects downward from a wall of said lamp body facing a region sandwiched by said rails, and said stabilizer comprises a pair of flange sections for engaging with said rails and an anchor-shaped hook having a flexible piece formed at a front end of said stabilizer, with which hook said engaging hole of said stopper plate engages.

10. The vehicular headlamp according to claim 9, further comprising a heat shield plate laid in the lower portion of said lamp body sandwiched by said rails.

11. The vehicular headlamp according to claim 10, wherein said heat shield plate is formed of a heat insulating material.

12. The vehicular headlamp according to claim 11, wherein said heat insulating material is iron.

13. The vehicular headlamp according to claim 11, wherein said heat insulating material is ceramic.

14. The vehicular headlamp according to claim 11, wherein said heat insulating material is silicone.

15. The vehicular headlamp according to claim 11, wherein said heat insulating material is asbestos.

16. The vehicular headlamp according to claim 1, further comprising an electromagnetic wave shield panel made of metal secured to a vehicle body for covering the headlamp.

17. The vehicular headlamp according to claim 6, wherein said cylindrical cover body and said unit case of said starter circuit unit are integrally formed of aluminum die-casting.

18. The vehicular headlamp according to claim 1, wherein said starter circuit unit is secured to said lamp body by screws.

19. The vehicular headlamp according to claim 1, wherein said stabilizer is secured to said lamp body by screws.

20. The vehicular headlamp according to claim 1, wherein the bottom wall of said lamp body comprises a couple of flanges extending downward for abutting against side surfaces of said stabilizer, said, flanges are formed with engaging holes, and said stabilizer comprises a couple of projections formed on the side surfaces thereof, said projections of said stabilizer are engageable with said respective engaging hole of said flanges by means of a convex-concavo lance engagement.

21. A vehicular headlamp comprising:

a vessel-shaped lamp body having a front opening and a bottom wall with a recessed portion therein;

a front lens coupled to said front opening of said lamp body;

a lamp chamber defined by said lamp body and said front lens;

a projection type headlamp unit comprising:
  a substantial elliptic reflector;
  a discharge bulb service as a light source disposed at a rear peak of said elliptic reflector; and
  a cylindrical lens holder one end of which coupled to said elliptic reflector; and
  a projection lens mounting to the other end of said lens holder and disposed in front of said discharge bulb, a reflection type headlamp unit comprising:
  a parabolic reflector, a front area of said parabolic reflector being larger than that of said elliptic reflector of said projection type headlamp unit;
  a bulb serving as a light source mounting to a rear peak of said parabolic reflector, and a lighting device for said discharge bulb of said projection type headlamp unit, said lighting device comprising a stabilizer and a starter circuit unit installing therein electronic components, said stabilizer and said starter circuit unit are separately disposed outside said lamp chamber, said stabilizer being detachably secured within said recessed portion.

22. A vehicular headlamp, comprising:

a vessel-shaped lamp body having a front opening;

a front lens coupled to said front opening of said lamp body;

a lamp chamber defined by said lamp body and said front lens;

a discharge bulb as a light source disposed in said lamp chamber;

a reflector disposed in said lamp chamber; and a lighting device for said discharge bulb, said lighting device comprising a stabilizer and a starter circuit unit installing therein electronic components, said stabilizer and said starter circuit unit are separately disposed outside said lamp chamber, wherein said lamp body comprises an opening section formed in a back wall thereof for exchanging said discharge bulb, said starter circuit unit is detachably secured to said opening section of said lamp body, and said stabilizer is detachably secured within a recessed portion formed under a bottom wall of said lamp body and under said projection type headlamp unit.

23. The vehicular headlamp according to claim 21, wherein said bulb of said reflection type headlamp unit is a incandescent type bulb.

24. The vehicular headlamp according to claim 21, wherein said bulb of said reflection type headlamp unit is a halide bulb.

25. The vehicular headlamp according to claim 21, wherein said projection type headlamp unit emits sub-beam and said reflection type headlamp unit emits main beam.

* * * * *